Sept. 15, 1953 P. G. PALMGREN ET AL 2,652,296
MULTIROW CYLINDRICAL ROLLER BEARING
Filed Sept. 3, 1948
6 Sheets-Sheet 1
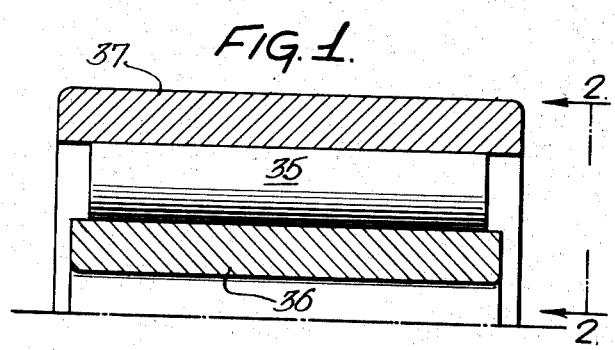
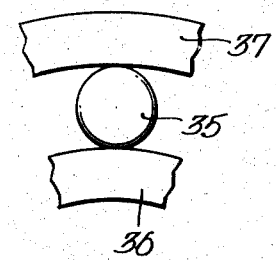
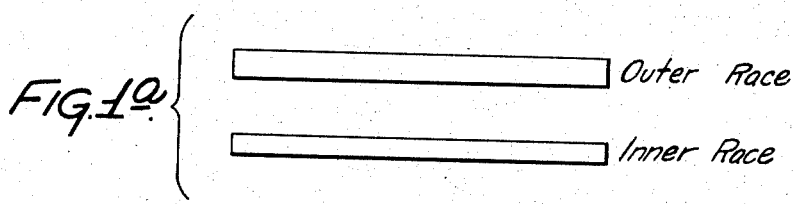
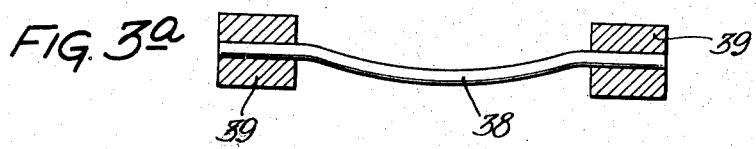
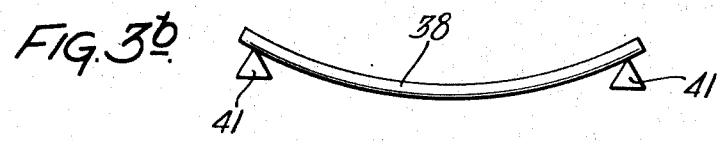
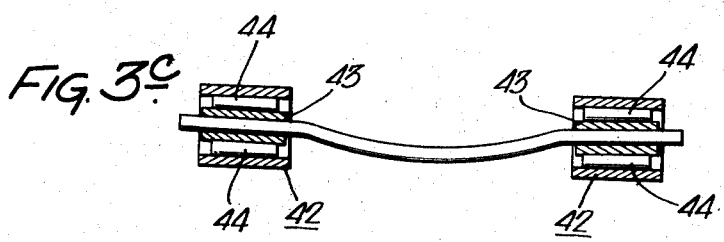
Inventors:
Per Gunnar Palmgren
Alfred Stewart Murray
by their Attorneys
Howson & Howson Inventors:
Per Gunnar Palmgren
Alfred Stewart Murray
by their Attorneys
Howson & Howson Sept. 15, 1953    P. G. PALMGREN ET AL    2,652,296
MULTIROW CYLINDRICAL ROLLER BEARING
Filed Sept. 3, 1948    6 Sheets-Sheet 3

Inventors:
Per Gunnar Palmgren
Alfred Stewart Murray
by their Attorneys
Howson & Howson

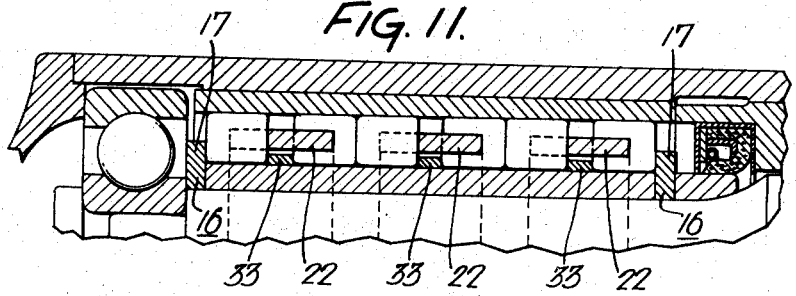
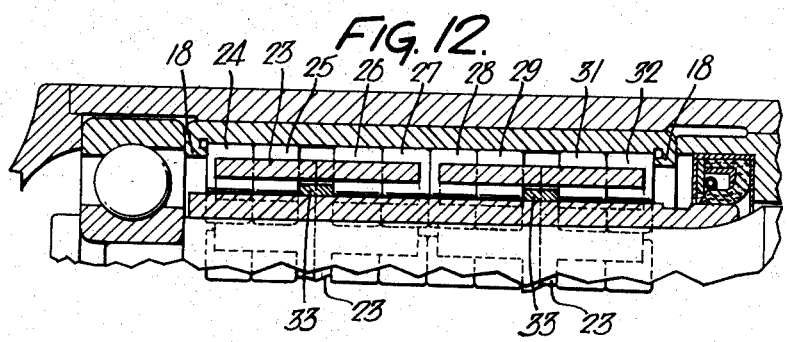
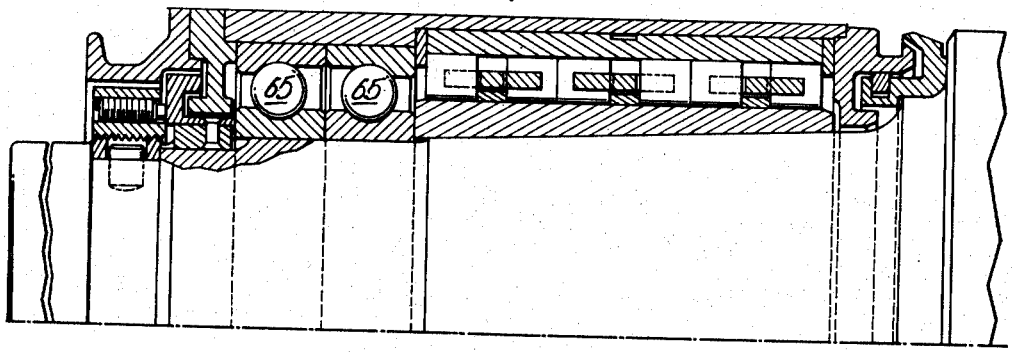
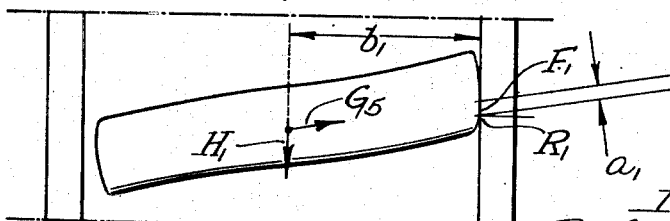

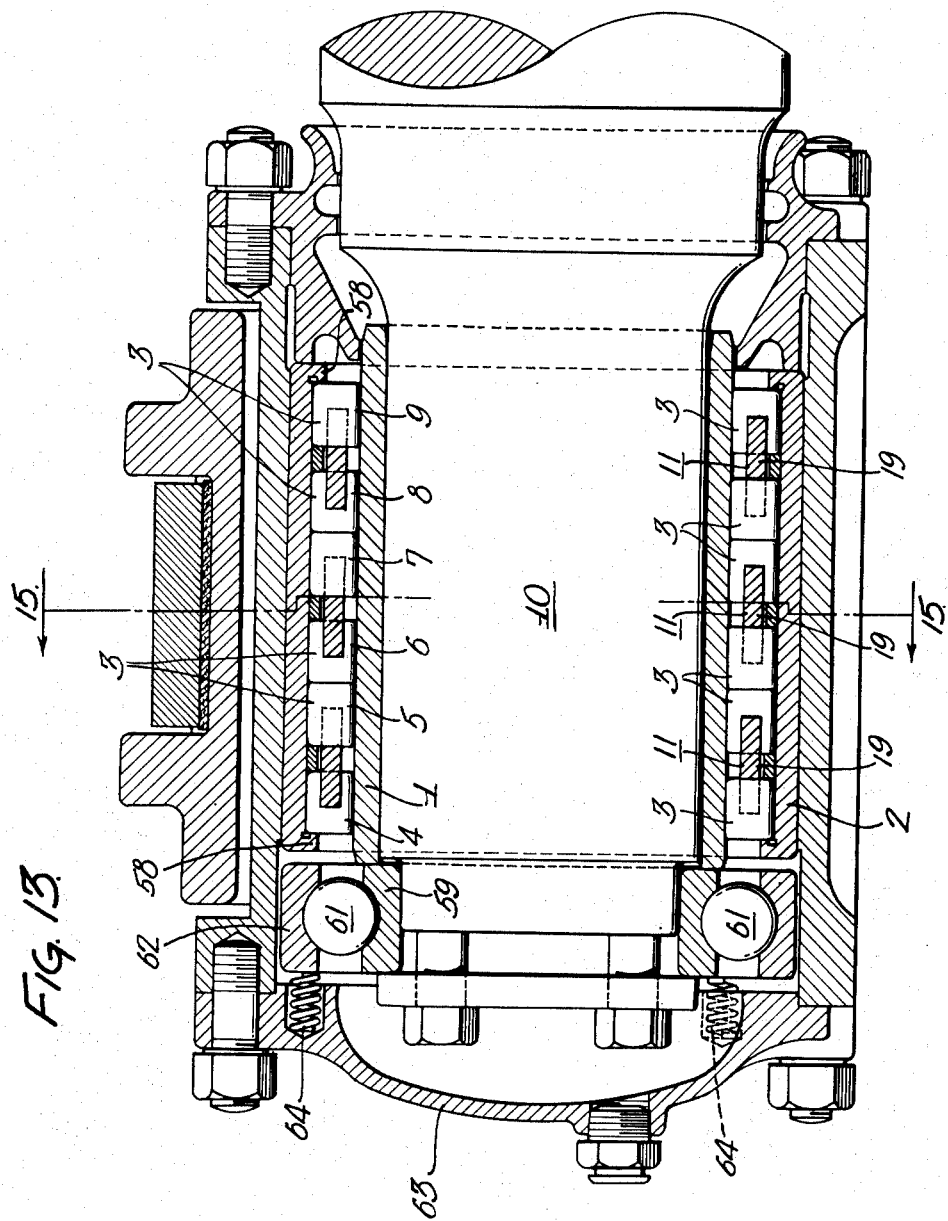

Patented Sept. 15, 1953

2,652,296

UNITED STATES PATENT OFFICE 2,652,296

MULTIROW CYLINDRICAL ROLLER BEARING

Per Gunnar Palmgren, Philadelphia, and Alfred Stewart Murray, Norristown, Pa., assignors to SKF Industries, Inc., Philadelphia, Pa., a corporation of Delaware Application September 3, 1948, Serial No. 47,684

19 Claims. (Cl. 308—180)

This invention relates to cylindrical roller bearing assemblies for applications having restricted space in the radial direction but ample space in the axial direction. Railway axles and the necks of rolls in rolling mills constitute examples of such applications. It relates also to combining therewith one or more ball bearings adapted to carry loads in either axial direction.

The principal object of the invention is to provide a cylindrical roller bearing of the aforesaid type which will have for a cage equipped bearing, the maximum number of flange guided rollers each proportioned to possess the highest individual fatigue resistance. This will form a bearing of the cage type with greater load capacity than heretofore produced.

Another object is to provide a roller bearing of high capacity taking radial load only, combined with a radial ball bearing mounted to permit limited axial float of an axle in both directions, but able to take axial load either way at the limit of the float allowance.

Another object is to provide a roller bearing of high capacity taking radial load only, combined with one or more ball bearings designed and mounted to take axial load in either direction.

Another object is to provide pressure against the face of the outer race of the floating ball bearing to prevent it from turning relatively the housing when not loaded, and thus avoid impact against the end cover while rotating which would produce ball skidding.

Another object is to provide a bearing of the aforesaid type organized so as to minimize cost of manufacture.

Another object is to provide a bearing of the aforesaid type whose rollers will suffer minimum detrimental effects due to misalignment between races.

Other objects will appear from the following description of the invention.

In the attached drawings:

Fig. 1 is a cross section in elevation of a cylindrical roller between two concentric cylindrical races;

Fig. 1a illustrates the shapes of the outer and inner race contact areas under load;

Fig. 2 is an end view of Fig. 1 showing the roller and bearing axes parallel;

Fig. 3a shows schematically a loaded shaft with the ends thereof fixed in supports considered relatively non-elastic;

Fig. 3b shows the same shaft freely supported at the ends;

Fig. 3c shows the shaft ends each fixed in the inner race of a bearing having long rollers which yield elastically.

Figure 6:
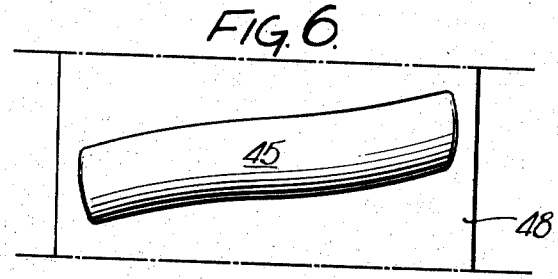
Fig. 6 is a schematic showing in plan of Figs. 4 and 5 with outer race removed, as viewed from the line 6—6, Fig. 4.
Figure 15:
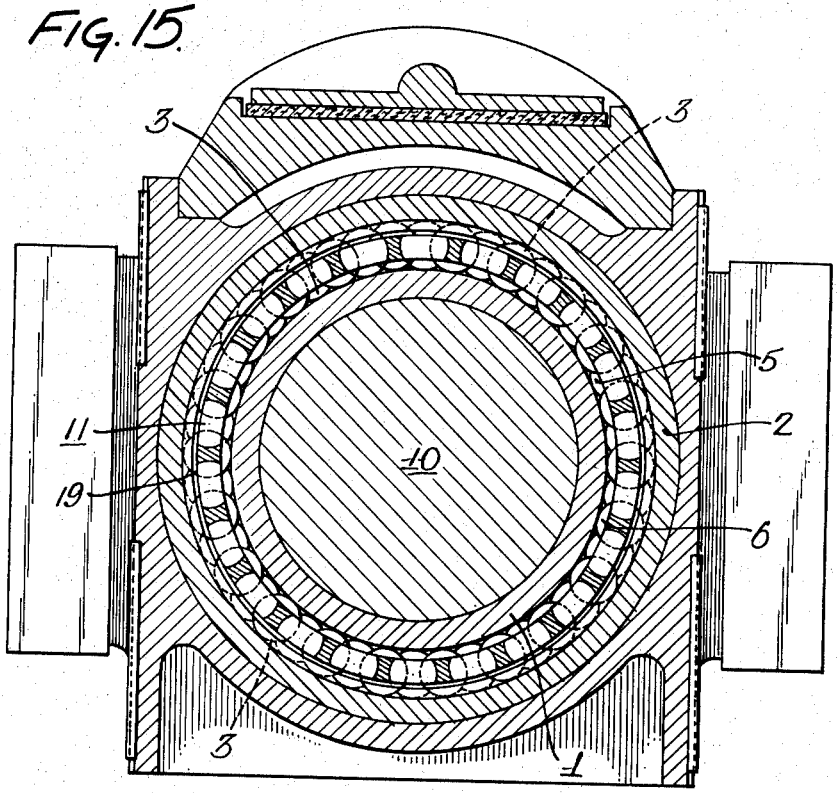
Figure 10:
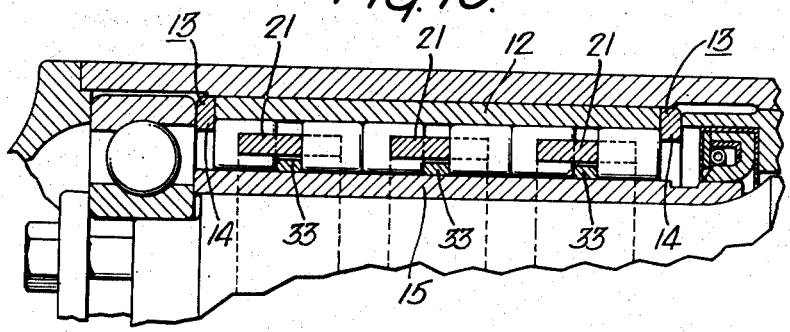
Fig. 10 is a cross sectional elevation of a radial roller bearing assembly, according to the invention, with separate flanges next to the outer race and spacers next to the inner race, combined with a single row ball bearing.
Figure 17:
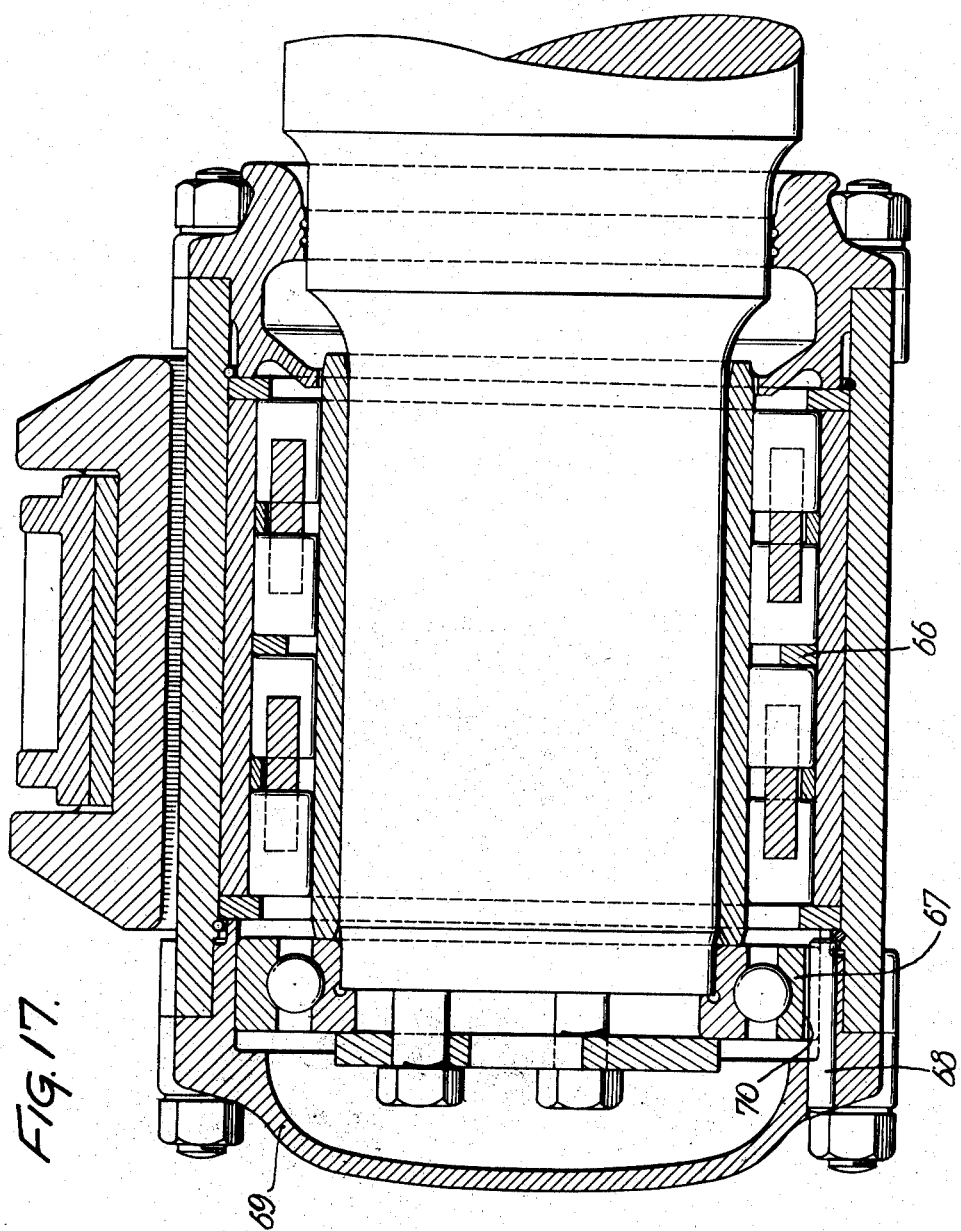

Fig. 11 corresponds to Fig. 10, but with separate flanges next to the inner race;

Fig. 12 is a corresponding view illustrating a different type of cage, each pocket carrying two tandem rollers instead of one single roller;

Fig. 13 is a cross sectional view in elevation of a radial roller bearing having integral flanges at the ends of the outer race and a ball bearing mounted to float axially and also to support axial load in either direction;

Fig. 14 is a schematic view in plan with outer race removed, similar to Fig. 6, showing the misalignment of a long roller;

Fig. 15 is a cross sectional view on the line 15—15 Fig. 13;

Fig. 16 is a cross sectional elevation of a roller bearing combined with two angular contact ball bearings, and typifies installations on the necks of rolls in rolling mills; and Fig. 17 is a sectional view similar to Fig. 13 but illustrating a modification within the scope of the invention.

Early designers of railway axles and also of rolling mills used so-called "plain bearings." Since capacity of such bearings to carry load depends upon the surface in contact, the designers made them long. They had no need to allot much space to thickness of the bearing metal of bronze or babbitt because only extent of surface had significance in capacity calculations.

In contrast, capacity of roller bearings depends upon diameter, as well as length of rollers, increasing with both equally so long as the two dimensions remain equal. When, however, length becomes greater than diameter, length fails to keep pace with diameter as a producer of capacity and adds less and less beneficial effect as its ratio to diameter goes above 1/1. However, the benefit of length does not fall off too unfavorably until this ratio exceeds 2/1 so that rollers of that proportion prove advantageous, particularly in installations suffering only small shaft deflections. Standard types of roller bearings have short rollers of large diameter, rather than long rollers of small diameter. Consequently, application of roller bearings in spaces laid out for plain bearings in established constructions becomes a real problem in any case, but a much more difficult one in railway axles and rolling mills.

Choice of adequate bearings of standard type for these applications would require that the end of the axle or roll neck be considerably reduced in size or the bore of the housing be increased to accommodate rollers of sufficient diameter to carry the extreme loads encountered. Such reductions are not permissible because breakages have occurred when they were made, and long established railway and mill standards prohibit increase in housing sizes.

These circumstances present the problem of providing a roller bearing having a low height and ample width in the cross section as distinguished from the present standard types which have the more advantageous proportions of more nearly equal height and width.

To meet these and other difficulties, our invention consists of a roller bearing having two long cylindrical races extending nearly the full length of the journal, and between them several rows of rollers, each roller in length equal to its diameter or a multiple thereof not exceeding two. Such a bearing is shown in Fig. 13, for example, wherein the cylindrical races are indicated by the reference numerals 1 and 2, and the rollers by the reference numeral 3. In this instance the rollers are arranged in six rows, designated 4 to 9 inclusive; and, as stated, the races 1 and 2 extend substantially the full length of the journal 10. Each pair of rows is equipped with a cage 11 for spacing individual rollers from others in the same row.

Referring now to Fig. 10, it is to be noted that in the embodiment therein illustrated the ends of the outer race 12 are ground parallel and each in a plane perpendicular to the bearing axis. An annular plate 13 having parallel faces and a bore smaller than that of the outer race 12, so that it extends inwardly therefrom to form a guide flange, indicated at 14, rests against each of these ends. Instead of the outer race, the ends of the inner race 15 may be so ground and plates 16, corresponding to the plates 13, provided at the ground ends, as indicated in Fig. 11. In this case the outside diameter of the plates 16 is greater than that of the inner race so as to form the guide flanges 17 at the ends of the inner race. When desirable, the aforesaid plates 13 or 16 may form integral parts of the associated race, as indicated at 18 in Fig. 12.

In the embodiment shown in Fig. 13, the cage 11 has a central body 19 with pockets on each side for two single rows of rollers. Thus, the rows 4 and 5 occupy pockets at opposite sides of the same cage, as also does the pair of rows 6 and 7 and the pair 8 and 9. It will be noted by reference to Fig. 15, however, that the pockets at one side of the cage are in each instance offset circumferentially from the pockets at the other side, so that in effect and as viewed from the axial direction, as in Fig. 15, the rollers of the one row are staggered with the rollers of the other row. The cages 21 and 22 of Figs. 10 and 11 are similarly formed, but in the embodiment shown in Fig. 12, the cages have bodies 23 with pockets extending on one side only and long enough to accommodate two rows of rollers. Thus, the corresponding rollers of the rows 24 and 25 of this embodiment occupy the same pocket of one cage, as also do the corresponding rollers of the adjoining pairs of rows, 26—27, 28—29, and 31—32. In the space either inwardly or outwardly of the body portion of the cage, the bearing has hard metal spacer rings 33 and 34 respectively, with parallel faces to guide the rollers and separate the rows sufficiently to prevent them from imposing any axial pressure upon the relatively soft metal body of the cage. These rings have faces ground perfectly parallel and rest loosely over the outside diameter of the inner race or within the inside diameter of the outer race.

To afford their full capacity to the bearing in which they operate, cylindrical rollers must remain in perfect parallel alignment with the bearing axis, because they possess line contact along their full length only when in that parallel position. Under load the line will widen to a rectangle because of elastic deformation of roller and race. Figs. 1 and 2 illustrate a long roller 35 in the parallel position between an inner race 36 and outer race 37. Fig. 1a shows the inner and outer roller-race contact areas. The pressure is uniform over both areas except for a small increase at the ends (not shown). In this position the roller rolls perfectly and with no distortion of contact area. The heavy loads on railway axles and mill rolls, cause them to bend as beams whose ends (necks or journals) are fixed in supports, i. e., the bearings, which yield elastically. Because of that, the deflection curve will differ from the conventional one in which the support, assumed as completely rigid, holds the beam end to a straight line throughout the length of the support. Fig. 3a indicates the nature of the latter curve, the cylindrical beam 38 being held rigidly at the ends in rigid supports 39, 39. Fig. 3b shows the circular curve the same beam would take if it rested on simple supports 41, 41; and Fig. 3c shows the deflection curve of the same beam supported in the roller bearings 42, 42. In 3a the supports 39 by assumption supply enough bending moment in reaction to neutralize the curvature completely. In 3b the bending moment reduces to zero at the supports 41 which contribute nothing to counteract it. In 3c the bearings 42 due to their yielding can supply enough reaction to counteract only part of the bending moment so that the final deflection curve will be between the two extremes shown in Figs. 3a and 3b. Accordingly, the journal (or neck) will deflect, but to a diminishing degree as it passes through toward the outboard side of the bearing. In this deflection the journal carries the inner race 43 with it. This pinches the loaded rollers of the bearing, designated in Fig. 3c by the reference numeral 44, more at one end than at the other and thereby creates a component force tending to cause the roller to move longitudinally in the inboard or outboard direction, depending upon at which end of the roller the pinch occurs. The inner race follows the curvature of the journal and the outer race bends in the same direction but to a lesser extent because of its greater rigidity and that of the housing which supports it. The resultant relative displacement of the two races widens the contact rectangle between the races and the rollers at the pinched end. The angular tilting of the inner towards the outer race decreases the space between them at the center of the loaded region of the bearing and increases the space in the unloaded portion so that in both directions, circumferentially, from the loaded portion of the bearing, the spacing between the races increases toward the unloaded region. The pinched end of the roller tends to move into this space and thus turn the roller aside into a skewed position. In turning, it encounters the adverse curvature of the outer race which bends it toward a position somewhat wrapped around the inner race. This position is illustrated in the schematic views of Figs. 4 and 5 which show a long roller 45 constituting the most loaded roller of the series in a roller bearing applied to the journal 46 of a car axle or roll neck 47. The inner race of the bearing is shown at 48 and the outer race at 49, and the journal box or housing within which the outer race is confined is shown at 51. In this case the journal 46, and with it the inner race 48, is deflected angularly so as to pinch the inboard end of the roller between the races, which, as noted above, tends to displace the roller from the normal position parallel to the bearing axis. Such displacement necessarily requires increased end region loading (D and E) by the outer race in order to bend the roller to the curvature of the inner race, and this in turn involves added inner race loading in the central region (F). These loads expand the roller contact areas on both races, and the wrapping distorts them. The excess load reduces bearing capacity directly, while the wrapping introduces sliding friction and wear which shortens endurance and hence bearing capacity indirectly.

Figure 7:
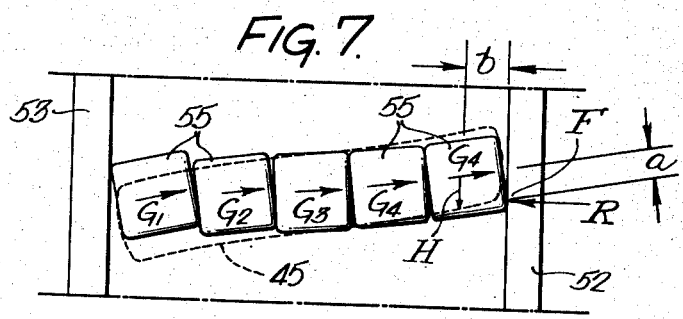
Fig. 7 is a corresponding schematic view but with a plurality of short rollers substituted for the single long roller of Fig. 6.

Long rollers turn more out of parallel with the bearing axis and wrap more around the inner race and consequently lose more capacity than short rollers for the same angular tilt between races. Comparison of Figs. 6 and 7 illustrates this and shows that short rollers individually will move less than long ones from the parallel position not only because of the lesser length, but also, where a number of rows of such rollers are used, because the ends of the rollers in adjoining rows can slip past one another or tilt out of line to follow the bending of the races. An individual row or a set of two rows of short rollers can roll slowly past an adjacent row or pair to compensate for slight dimensional errors or differences of deflection which act to produce differences in speed ratios. A single long roller of corresponding length would either skew to accommodate itself or operate with abnormal friction. Moreover long rollers cannot be made nearly so close to true cylinders having ends as square with axes as short ones. For these reasons we find short rollers provide greater capacity than long rollers in the same space. As clearly shown in Fig. 15 the cage pockets are so close together that each roller is overlapped by the one or two opposite rollers of the abutting row to the extent of at least one-half of the diameter of its end surface and preferably to the extent of 75% to 80% of said diameter. This assures an ample surface at all times for support of thrust load and also that any one roller cannot enter the space between adjacent rollers of the abutted series enough to get below the "corner round" at the roller edges, which would cause one roller to trip and lock against the next and thus jam the whole bearing.

Figure 4:
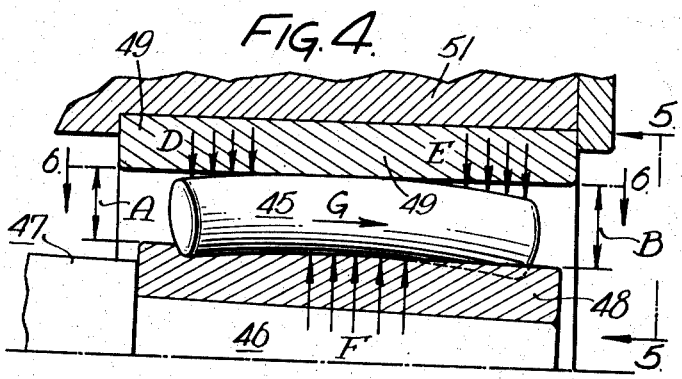
Fig. 4 is a cross section in elevation and Fig. 5 is a corresponding end view illustrating on a greatly exaggerated scale a long roller between two concentric cylindrical races with the said roller turned out-of-parallel with the bearing axis due to tilt of inner toward outer race under load.
Figure 5:
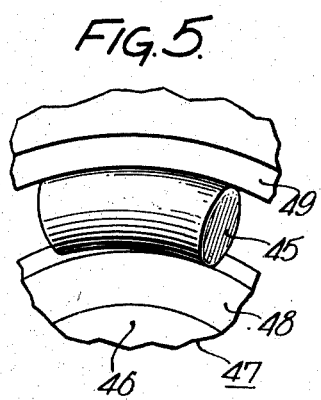
Figure 8:
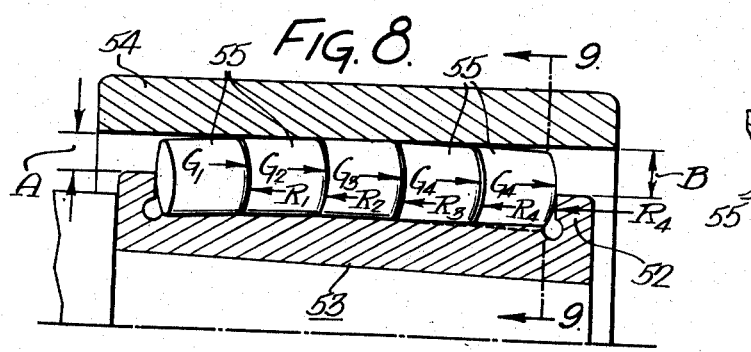
Figs. 8 and 9 are cross sectional and end views, respectively, illustrating, schematically, the short rollers of Fig. 7 skewed and crowded against the race flange due to pinching at one end by the load.
Figure 9:
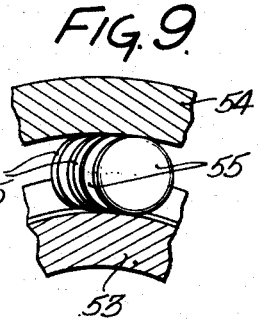

The aforesaid pinching of one end of the roller shown at the left end of Fig. 4 produces a tapered space between the races opening toward the right (A is less than B). This creates a component force G tending to move the roller longitudinally toward the right. Experience has demonstrated that cylindrical rollers in operating bearings always move axially and consequently thrust surfaces are required to keep them in place. Each small roller 55 in Fig. 7 (see also Figs. 8 and 9) exerts a force, produced equally by both races, which acts along the axis. These forces diminish from left to right as indicated by the arrows $G_1$, $G_2$, $G_3$ and $G_4$ (the last roller being least pinched adds little or nothing). The sum of all of the forces, here taken as $G_4$, forms a righting couple with the reaction $R_4$ from the flange 52 of the inner race 53 which is distributed over the whole series of rollers substantially as indicated in Fig. 8 by the arrows $R_4$, $R_3$, $R_2$ and $R_1$. Points of application of these reactionary forces will vary in accordance with the relative tilt between rollers so that the righting couples will have different values as each roller travels through the loaded zone of the bearing. The couples will act favorably to realign the rollers in about 80% of all roller positions. It will be noted that the same condition of misalignment exists between the inner race 53 and outer race 54 of Fig. 8 as between the races in Fig. 4, as indicated by the discrepancy between the spaces A and B. A force H (Fig. 7) acts to roll each of the rollers over the inner race (downward in the plane of the paper). The friction F of the edge of the near roller against flange 52 reacts with the flange to form a couple with H, which tends to cause skewing. The arm of this couple is $b$. The righting couple must have a value greater than the friction couple to produce the desired tendency to realignment. In this case, $G_4 \times a$ must be greater than $H \times b$. A short roller will obviously always have a positive and substantial distance, $a$, between roller center and edge. A longer roller will always have relatively less $a$ and more $b$, which will decrease the net realigning effect. Fig. 14 shows the righting couple $G_5 \times a_1$ exceeded by the skewing couple $H_1 \times b_1$ which has a high value due to its long arm and greater roll driving force $H_1$.

We have described end pinching as a cause of axial thrust. Other causes exist however such as errors in dimensions which form tapers sufficient to generate an axial force and this can act in the reverse direction to that above noted or in the same direction. Experience shows that cylindrical rollers always move axially in one direction or the other and that they skew. The causes cannot always be determined.

Roller bearings of all types so far designed, incorporate either integral flanges or use separate pieces placed against the ends of the races to support these axial pressures. In those bearings each flange supported only one row so that bearings having more than one row, had sufficient flanges to care for each one separately.

The roller bearings of this invention possess a new high figure in capacity for a bearing of the class described where space between journal and housing available for races and rollers is inadequate for standard types of bearing and restricted in a manner not suitable for their use. Aside from the use of the aforesaid most advantageous proportion of roller in which length equals diameter, or not more than twice the diameter, we achieve this high capacity by using spacing rings within the space normally occupied by the necessary cage body and filling the space so saved with additional rollers, or roller lengths. In another embodiment we save still more space for roller length by butting together the ends of the rollers which project beyond the cage pockets. The previously mentioned crowding pressure on these roller ends and rings guides the rollers into alignment parallel with the bearing axis successfully and in the same manner as flanges.

The spacer rings have good width and substantial rigidity so that they suffer little deflection from roller to roller as one row of rollers presses them against the next. Since the spacer rings abut many of the roller ends in two adjacent rows they will strongly resist being turned aside from coincidence of their axes with the axes of the bearing rings, and thereby constitute a close equivalent to a firmly fixed flange. Yet the rings occupy the room required for the cage body and hence waste none of the available roller space.

In one type of roller bearing, shown in Figs. 10 and 11, we have given both races straight bores and outside diameters with no interruptions, and used separate identical rings for the guide flanges at the ends of the races and other identical rings for spacers. These arrangements make possible the production of bearings of high precision at a minimum of manufacturing cost. This type functions properly only where the separate end flanges are locked solidly at the ends of the race.

It is well known that a car axle while traveling along a track continually moves from side to side due to the conical shape of the wheel tread. The hunting motion would carry a car body with it except for the devices used in various designs of truck to lessen the final effect on the body.

Some trucks have side frames and cross members cast in one piece, or have cross members solidly fastened to the side members. These provide for a suspension of the truck bolster which allows a transverse swinging either because of pendulum connection, soft springs, or some combination thereof. In addition, the plain, or friction, bearings still quite commonly installed in such trucks, take the axial or thrust load on the ends of the babbitt lined brass which also carries the radial load. By providing clearances between the ends of the brass and the thrust shoulders of the axle, a limited hunting motion by the axle may occur without affecting the truck. Plain bearings inherently permit sliding between the bearing surfaces in both the rotational and axial directions. Because of the weight of metal and complexity of parts, these rigidly framed trucks are expensive and hence suitable only for the more expensive rolling stock such as passenger cars.

Trucks for freight cars cannot cost nearly so much and need not provide so smooth a ride for lading as is required for passengers. Consequently, freight car trucks consist of few parts, mostly cast and designed to fit loosely together, thus eliminating or reducing machining to the least amount necessary. Usually the side frames connect with each other only through truck springs and truck bolsters at their centers and hence can move independently to a considerable degree. The journal boxes are cast integrally with side frames but due to the use of a wedge interposed between the journal bearing brass and the housing, a considerable degree of out-of-squareness between frames can take place in operation. As elements of the truck assembly become worn, a greater degree of misalignment can occur. The mounting and construction of the journal bearings therein control the transverse movement of each box, because the box carries with it respectively either the pillow of a plain bearing or the outer race of an anti-friction bearing, and the ends of the pillow or the rolling elements of the anti-friction bearing come up against a thrust shoulder of the axle or against a flange of the inner race which grips the shaft with a press fit. By far, most of the present day freight car journals operate on friction bearings in which a predetermined clearance exists between the ends of the brass and the thrust shoulders of the axle. This clearance permits a limited hunting action of the axle to go on without communicating the motion to the box except as the friction drag may communicate it to a slight degree. This combination of truck structure and friction bearing constitutes a low cost truck having practical value but handicapped by several undesirable features such as high friction especially when starting, fast wear, high maintenance expense, hot box danger and riding qualities too rough for much of the freight car lading at present day high speeds.

Prior to the cylindrical roller bearings of this invention and the novel method herein disclosed of utilizing in combination therewith the properties of a deep groove ball bearing, anti-friction bearings required locking of the assemblies together in order to keep the races in proper contact with the rolling elements. Therefore, they suited the first mentioned passenger car trucks, the parts of which remain in fixed positions relatively to each other, and could not operate in the freight car trucks with their loosely connected parts.

In contrast, we apply a combination of cylindrical roller bearing and deep groove ball bearing to the freight car truck with good success. In this installation (see Fig. 13) the cylindrical roller bearing has integral flanges 58 on the outer race 2, but no flanges on the inner race. This keeps the set of rolling elements 3 in fixed relation to the outer race and with each other, and permits axial movement of the inner race relatively to the outer race. The inner race of the ball bearing is press fitted to the axle journal 10 and locked against the inner race 59 of the roller bearing 61 so that it partakes of the hunting action of the axle. To accommodate this motion, we leave clearances on both sides of the outer race 62 of the ball bearing, and clearance circumferentially around the outer race 62 so that it has no contact with the bore of the journal box. With this arrangement, the cylindrical roller bearing takes only radial load, while the ball bearing takes only axial load. However, it can take no axial load until in its axial movement it passes across the clearance space so that the outer race comes up against either the end cover 63 or the flange 58 of the outer race 2 of the cylindrical roller bearing. Since we set all of the bearings at both ends of the axle in the same relative position, the ball bearing at one end will reach a thrust supporting surface at the same time as the ball bearing at the other end. One will come up against the end cover 63 while the other comes up against the said flange 58. Thus, much of the time both deep groove bearings will divide the axial load between them. Such cooperation will increase endurance. Because of these bearing designs and this combination thereof, we also accommodate the independent weaving motion of the loosely connected side frames.

Because sufficient friction exists between balls and outer race to cause it to rotate while not in contact with a supporting surface, we have put several coil springs 64 into pockets in each end cover 63. We could obviously maintain the same pressure by some other type of spring or by using a resilient material such as rubber. Such devices continually exert enough pressure against the face of the ball bearing outer race 62 to keep it stationary thus preventing sudden stoppage thereof as it comes into contact with either of said thrust surfaces. This combination constitutes a novel arrangement.

The bearing shown in Fig. 16 is adapted for installations, such as on the rolls of rolling mills, where it is desirable or necessary to avoid axial play of the journaled member. In this case, two angular contact ball bearings 65 are employed in conjunction with a roller bearing of the character described above. In this case the bearing as a whole is preloaded, the inner and outer races of both the roller and ball components being precluded from movement in the axial direction.

In the bearing shown in Fig. 17, the confronting ends of the rollers of the adjoining rows, which in previously described embodiments abut each other, are in this case spaced apart by means of a ring 66, an arrangement which, while not affording the space advantage of the other embodiment, still represents a material advantage over prior conventional constructions. In this embodiment, also, rotation of the outer race 67 of the ball bearing section is prevented by a pin 68 in the cover member 69, said pin passing slidably through a groove 70 in the said race as illustrated.

I claim:

1. Roller bearing comprising independently rotatable rows of rollers, the ends of the rollers of one row abutting the proximate ends of the rollers of another independently rotatable row, and a cage for each of said rows having pockets for the individual rollers and retaining the rollers of the respective rows in circumferential relatively spaced relation, said pockets being so close together that the end of each roller may simultaneously overlap to a substantial extent the ends of two adjoining rollers of the abutting row.

2. A cylindrical roller bearing according to claim 1 wherein the pockets of the respective cages are so close together that the end of each roller is overlapped by the opposite roller or rollers of the abutting row to the extent of at least one-half the diameter of the roller end.

3. A cylindrical roller bearing according to claim 2 wherein the ratio of length to diameter of the individual roller lies within the range of 1:1 to 2:1.

4. A cylindrical roller bearing having a plurality of rows of rollers, a cage circumferentially spacing the rollers of two adjacent rows of said rollers, said cage having a central annular body intervening between said rows with roller pockets on both sides thereof, and a separate guide ring as wide at least as the central body of said cage and in radial alignment with said body, the ends of the rollers of one row protruding from the cage pockets and abutting the proximate ends of rollers of an adjoining row.

5. A cylindrical roller bearing according to claim 4 wherein the ratio of length to diameter of the individual roller lies within the range of 1:1 to 2:1.

6. A cylindrical roller bearing according to claim 4 wherein the cage pockets at the respective sides of the central body lie so close together that the minimum overlap between the abutting roller ends is one-half the diameter of the individual end.

7. A cylindrical roller bearing according to claim 6 wherein the ratio of length to diameter of the individual roller lies within the range of 1:1 to 2:1.

8. In an axle-journal assembly, a housing for the journal, a bearing interposed between the housing and the journal, said bearing comprising a roller bearing section including an inner race ring fixed to the journal and an outer race ring in radial-load bearing relation with the housing, and comprising also a ball bearing section including an inner race ring also fixed to the journal and an outer race ring free from said housing for axial movement with respect to the latter, means for limiting the axial displacement of the last named race ring in and with respect to the housing so as to afford an axial thrust bearing relationship between the ball bearing and the housing, said ball bearing race rings being separate from the race rings of the roller bearing so that the bearings constitute individual units for separate assembly and disassembly with and from the journal.

9. A bearing according to claim 8 in which the ball bearing section includes two corresponding ball bearings one at each end of said ball bearing section and placed so that they divide the total axial load substantially equally.

10. A bearing comprising independently rotatable rows of rollers, the ends of the rollers of one row abutting the proximate ends of the rollers of another row, and a deep groove ball bearing arranged to assume thrust load in both directions longitudinally of the common axis of said rows.

11. A cylindrical roller bearing having a plurality of rows of rollers, a cage circumferentially spacing the rollers of two adjacent rows of said rollers, said cage having a central annular body intervening between said rows with roller pockets on both sides thereof, a separate guide ring as wide at least as the central body of said cage and in radial alignment with said body, the ends of the rollers of one row protruding from the cage pockets and abutting the proximate ends of rollers of an adjoining row, and a deep groove ball bearing arranged to assume axial load in both directions.

12. A journal box or like bearing having a roller section for radial load, said roller comprising inner and outer race members and a plurality of rows of rollers between said races, a deep groove ball section also comprising inner and outer races and arranged to assume thrust load, a journal casing embracing said bearing sections and comprising an end cover member adjoining the said ball section, means for locking the inner race of the ball section against the inner race of the roller section, the outer race of the ball section having clearance both with the outer race of the roller section and said cover member and also radially with the said casing, and fixed resilient means for exerting axial frictional pressure upon the outer race of the ball section.

13. A bearing according to claim 12 wherein the fixed resilient means consists of springs supported by the cover member and pressing against the outboard face of the ball bearing outer race.

14. A journal box or like bearing having a roller section for radial load, said roller section comprising inner and outer race members and a plurality of rows of rollers between said races, a deep groove ball section also comprising inner and outer races and arranged to assume thrust load, a journal casing embracing said bearing sections and comprising an end cover member adjoining the said ball section, means for locking the inner race of the ball section against the inner race of the roller section, the outer race of the ball section having clearance both with the outer race of the roller section and said cover member and also radially with the said casing, and a fixed member passing slidably through a groove in the outer race of the ball section to anchor said race against rotation.

15. A journal box or like bearing having a roller section for radial load, said roller comprising inner and outer race members and a plurality of rows of rollers between said races, a deep groove ball section also comprising inner and outer races and arranged to assume thrust load, a journal casing embracing said bearing sections and comprising an end cover member adjoining the said ball section, means for locking the inner race of the ball section against the inner race of the roller section, the outer race of the ball section having clearance both with the outer race of the roller section and said cover member and also radially with the said casing, and means for retaining the outer race of the ball section against rotation while leaving said race free for movements both axially and radially.

16. A bearing according to claim 15 wherein the ratio of roller length to roller diameter lies in the range of 1:1 to 2:1.

17. A roller bearing comprising a plurality of independently rotatable rows of rollers, cage means circumferentially spacing the rollers of each row, and axially free means independent of the cage means and engaging confronting ends of the rollers for axially spacing the said rows of rollers.

18. A bearing according to claim 17 wherein the said axial spacing means comprises a spacing ring between the confronting ends of the rollers of adjoining rows.

19. A bearing according to claim 18 wherein the said ring is separate from the roller races.

PER GUNNAR PALMGREN.
ALFRED STEWART MURRAY.

References Cited in the file of this patent

UNITED STATES PATENTS

| Number | Name | Date |
|---|---|---|
| 1,002,442 | Perkins | Sept. 5, 1911 |
| 1,100,402 | Sharpneck | June 16, 1914 |
| 1,199,404 | Miller | Sept. 26, 1916 |
| 1,418,304 | Halsey | June 6, 1922 |
| 1,475,053 | Cooper | Nov. 20, 1923 |
| 1,638,957 | Pitt | Aug. 16, 1927 |
| 1,966,924 | Couch | July 17, 1934 |
| 1,995,571 | Lott | Mar. 26, 1935 |
| 2,102,952 | Hellyar | Dec. 21, 1937 |
| 2,470,071 | Hilton | May 10, 1949 |

FOREIGN PATENTS

| Number | Country | Date |
|---|---|---|
| 1,754 | Great Britain | 1914 |
| 21,139 | Norway | Feb. 6, 1911 |
| 297,531 | Italy | July 14, 1932 |